United States Patent
Cava

(10) Patent No.: US 11,765,421 B2
(45) Date of Patent: Sep. 19, 2023

(54) CLIENT BASED STORAGE OF REMOTE ELEMENT RESOLUTIONS

(71) Applicant: HULU, LLC, Santa Monica, CA (US)

(72) Inventor: Zachary McKeel Cava, Seattle, WA (US)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 17/188,151

(22) Filed: Mar. 1, 2021

(65) Prior Publication Data

US 2021/0274241 A1    Sep. 2, 2021

Related U.S. Application Data

(60) Provisional application No. 62/983,358, filed on Feb. 28, 2020.

(51) Int. Cl.
*H04N 21/431* (2011.01)
*H04N 21/84* (2011.01)
(Continued)

(52) U.S. Cl.
CPC ..... *H04N 21/4316* (2013.01); *H04N 21/4356* (2013.01); *H04N 21/812* (2013.01); *H04N 21/84* (2013.01)

(58) Field of Classification Search
CPC .......... H04N 21/4316; H04N 21/4356; H04N 21/812; H04N 21/84
See application file for complete search history.

(56) References Cited

U.S. PATENT DOCUMENTS 8,799,943 B1 * 8/2014 Sherwin ............... H04N 21/845
                                                          33/36
9,491,522 B1   11/2016 Trollope et al.
(Continued)

FOREIGN PATENT DOCUMENTS

BR   1120220161620     8/2022
BR   1120220169167    10/2022
(Continued)

OTHER PUBLICATIONS

Iraj Sodagar, Microsoft Corporation, "White paper on MPEG-DASH Standard", 6 pages, Apr. 2012, Incheon, KR.
(Continued)

*Primary Examiner* — Michael R Telan
(74) *Attorney, Agent, or Firm* — Kwan & Olynick LLP

(57) ABSTRACT

In some embodiments, a method receives a manifest presentation description for a media presentation. The manifest presentation description includes an opportunity that requires resolution to determine supplemental content for the opportunity. A request to resolve the opportunity is sent where information for the supplemental content that is received from the request is inserted in an instance of the media presentation description. The method stores the information for the supplemental content in association with an identifier for the opportunity. An update to the manifest presentation description is received where the update includes the opportunity. The method retrieves the information for the supplemental content that was stored in association with the identifier for the opportunity and inserts the information for the supplemental content into the instance of the update to the manifest presentation description.

21 Claims, 17 Drawing Sheets

(51) Int. Cl.
*H04N 21/81* (2011.01)
*H04N 21/435* (2011.01)

(56) References Cited

U.S. PATENT DOCUMENTS

| | | |
|---|---|---|
| 2005/0289588 A1 | 12/2005 | Kinnear |
| 2012/0042090 A1 | 2/2012 | Chen et al. |
| 2012/0243850 A1 | 9/2012 | Basra et al. |
| 2014/0068690 A1 | 3/2014 | Luthra et al. |
| 2014/0150019 A1* | 5/2014 | Ma ................ H04N 21/458 725/34 |
| 2014/0359081 A1* | 12/2014 | Van Deventer ......... H04L 67/63 709/219 |
| 2015/0019629 A1* | 1/2015 | Giladi ................ H04L 67/02 709/203 |
| 2015/0067722 A1 | 3/2015 | Bjordammen et al. |
| 2015/0269629 A1 | 9/2015 | Lo et al. |
| 2016/0294909 A1 | 10/2016 | Killick et al. |
| 2017/0171287 A1 | 6/2017 | Famaey |
| 2017/0272983 A1 | 9/2017 | Oyman et al. |
| 2017/0310722 A1 | 10/2017 | Chen et al. |
| 2017/0310752 A1 | 10/2017 | Knothe |
| 2017/0359628 A1* | 12/2017 | Sachdev .......... H04N 21/44016 |
| 2018/0097864 A1* | 4/2018 | Brinkley ............. H04L 65/1089 |
| 2018/0152741 A1* | 5/2018 | Asarikuniyil ........... H04L 65/65 |
| 2019/0075148 A1* | 3/2019 | Nielsen ............ H04N 21/47217 |
| 2019/0141367 A1 | 5/2019 | Loheide et al. |
| 2019/0238950 A1 | 8/2019 | Stockhammer et al. |
| 2019/0313150 A1 | 10/2019 | Cava |
| 2021/0144422 A1 | 5/2021 | Wagner et al. |
| 2021/0274241 A1 | 9/2021 | Cava |
| 2021/0274245 A1 | 9/2021 | Cava |

FOREIGN PATENT DOCUMENTS

| | | |
|---|---|---|
| CN | 115136609 A | 9/2022 |
| CN | 115136611 A | 9/2022 |
| EP | 4111700 | 8/2022 |
| EP | 4111698 A1 | 1/2023 |
| KR | 10-2012-0029299 A | 3/2012 |
| KR | 10-2019-0128120 A | 11/2019 |
| WO | 2021174214 A1 | 9/2021 |
| WO | 2021174219 A1 | 9/2021 |

OTHER PUBLICATIONS

Steve DeRose, et al., "XML Linking Language (XLink) Version 1.1", 25 pages, May 6, 2010.
Related U.S. Appl. No. 17/188,238, filed Mar. 1, 2021, 60 pages, unpublished.
International Search Report and Written Opinion for International Appln. No PCT/US2021/020340 dated Jun. 18, 2021, 11 pages.
Related International Search Report and Written Opinion for International Appln. No. PCT/US2021/020348 dated Jun. 18, 2021, 11 pages.
International Application No. PCT/US2021/020340, filed Mar. 1, 2021, International Preliminary Report on Patentablility and Written Opinion, dated Aug. 30, 2022, 7 pages.
International Application No. PCT/US2021/020340, filed Mar. 1, 2021, International Preliminary Report on Patentablility and Written Opinion, dated Aug. 30, 2022, 6 pages.
International Application No. PCT/US2021/020348, filed Mar. 1, 2021, International Preliminary Report on Patentability and Written Opinion, dated Aug. 30, 2022, 6 pages.
Indian First Examination Report, Application No. 202247045649, dated Nov. 23, 2022, 6 pages.
Indian First Examination Report, Application No. 202247046177, dated Nov. 28, 2022, 5 pages.

* cited by examiner

```xml
<?xml version="1.0" encoding="UTF-8" standalone="yes"?>
<MPD xmlns="urn:mpeg:dash:schema:mpd:2011" xmlns:xlink="http://www.w3.org/1999/xlink" ... type="dynamic" minimumUpdatePeriod="PT3.0S" availabilityStartTime="2017-05-01T07:00:00+00:00" ...>
    <Period id="content-1" start="PT86703733.598S" ...>
        <AdaptationSet id="2" mimeType="video/mp4" ...>
306-1   <SegmentTemplate timescale="90000" presentationTimeOffset="942466848" media="..." initialization="..." ...>
            <SegmentTimeline>
                <S t="942466848" d="360360" r="5"/>
            </SegmentTimeline>
        </SegmentTemplate>
        <Representation id="video-1" ...>
            ....
        </Representation>
        ...
        </AdaptationSet>
        <AdaptationSet id="1" mimeType="audio/mp4" ...>...</AdaptationSet>
        ...
    </Period>        302           304
    <Period id="adbreak-1" start="PT86703757.622S" xlink:href="https://example.com/manifests/xlink/1?live=60.06" xlink:actuate="onRequest">
        <AdaptationSet id="2" mimeType="video/mp4" ...>
        <SegmentTemplate timescale="90000" presentationTimeOffset="944629008" media="..." initialization="..." ...>
            <SegmentTimeline>
                <S t="944629008" d="360360" r="14"/>
            </SegmentTimeline>
        </SegmentTemplate>
        <Representation id="video-1" ...>
            ....
        </Representation>
        ...
        </AdaptationSet>
        <AdaptationSet id="1" mimeType="audio/mp4" ...>...</AdaptationSet>
        ...
```

FIG. 3A

```
</Period>                    306-2
  <Period id="content-2" start="PT86703817.682S" ...>
    <AdaptationSet id="2" mimeType="video/mp4" ...>
      <SegmentTemplate timescale="90000" presentationTimeOffset="950034408" media="..." initialization="..." ...>
        <SegmentTimeline>
          <S t="950034408" d="360360"/>
        </SegmentTimeline>
      </SegmentTemplate>
      <Representation id="video-1" ...>
        ....
      </Representation>
      ...
    </AdaptationSet>
    <AdaptationSet id="1" mimeType="audio/mp4" ...>...</AdaptationSet>
    ...
  </Period>
</MPD>
```

FIG. 3B

```
                    602-1
                      ⤵
<Period id="remote-1-1-1" duration="PT30.03S" ...>
   <AdaptationSet mimeType="video/mp4" ...>
      <Representation id="video-1" ...>...</Representation>
      ...
   </AdaptationSet>
   <AdaptationSet mimeType="audio/mp4" ...>
      <Representation id="audio-1" ...>...</Representation>
      ...
   </AdaptationSet>
   ...
</Period>       602-2
                  ⤴
<Period id="remote-1-1-2" duration="PT30.03S" ...>
   <AdaptationSet mimeType="video/mp4" ...>
      <Representation id="video-1" ...>...</Representation>
      ...
   </AdaptationSet>
   <AdaptationSet mimeType="audio/mp4" ...>
      <Representation id="audio-1" ...>...</Representation>
      ...
   </AdaptationSet>
   ...
</Period>
```

FIG. 6

| Resolution Cache Table | |
|---|---|
| Resolution Entity ID | Resolution Result |
| adbreak-1 | <u>702-1</u> Period  <u>702-2</u> Period<br>@id="remote-1-1-1"  @id="remote-1-1-2" |

```xml
<?xml version="1.0" encoding="UTF-8" standalone="yes"?>
<MPD xmlns="urn:mpeg:dash:schema:mpd:2011" xmlns:xlink="http://www.w3.org/1999/xlink" ... type="dynamic" minimumUpdatePeriod="PT3.0S" availabilityStartTime="2017-05-01T07:00:00+00:00" ...>         804-1
   <Period id="content-1" start="PT86703733.598S" ...>
      <AdaptationSet id="2" mimeType="video/mp4" ...>
         <SegmentTemplate timescale="90000" presentationTimeOffset="942466848" media="..." initialization="..." ...>
            <SegmentTimeline>
               <S t="942466848" d="360360" r="5"/>
            </SegmentTimeline>
         </SegmentTemplate>
         <Representation id="video-1" ...>
            ....
         </Representation>
         ...
      </AdaptationSet>
      <AdaptationSet id="1" mimeType="audio/mp4" ...>...</AdaptationSet>
      ...                    802-1
   </Period>
   <Period id="remote-1-1-1" duration="PT30.03S" ...>
      <AdaptationSet mimeType="video/mp4" ...>
         <Representation id="video-1" ...>...</Representation>
         ...
      </AdaptationSet>
      <AdaptationSet mimeType="audio/mp4" ...>
         <Representation id="audio-1" ...>...</Representation>
         ...
      </AdaptationSet>
      ...            802-2
   </Period>
   <Period id="remote-1-1-2" duration="PT30.03S" ...>
      <AdaptationSet mimeType="video/mp4" ...>
         <Representation id="video-1" ...>...</Representation>
         ...
      </AdaptationSet>
      <AdaptationSet mimeType="audio/mp4" ...>
         <Representation id="audio-1" ...>...</Representation>
         ...
      </AdaptationSet>
      ...
```

FIG. 8A

```
                    804-2
</Period>             ⌐
    <Period id="content-2" start="PT86703817.682S" ...>
      <AdaptationSet id="2" mimeType="video/mp4" ...>
        <SegmentTemplate timescale="90000" presentationTimeOffset="950034408"
media="..." initialization="..." ...>
          <SegmentTimeline>
            <S t="950034408" d="360360"/>
          </SegmentTimeline>
        </SegmentTemplate>
        <Representation id="video-1" ...>
          ....
        </Representation>
        ...
      </AdaptationSet>
      <AdaptationSet id="1" mimeType="audio/mp4" ...>...</AdaptationSet>
      ...
    </Period>
</MPD>
```

FIG. 8B

```xml
<?xml version="1.0" encoding="UTF-8" standalone="yes"?>
<MPD xmlns="urn:mpeg:dash:schema:mpd:2011" xmlns:xlink="http://www.w3.org/1999/
xlink" ... type="dynamic" minimumUpdatePeriod="PT3.0S" availabilityStartTime="2017-05-
01T07:00:00+00:00" ...>
   <Period id="content-1" start="PT86703733.598S" ...>
     <AdaptationSet id="2" mimeType="video/mp4" ...>
       <SegmentTemplate timescale="90000" presentationTimeOffset="942466848" media="..." initialization="..." ...>
         <SegmentTimeline>
           <S t="942466848" d="360360" r="5"/>
         </SegmentTimeline>
       </SegmentTemplate>
       <Representation id="video-1" ...>
         ....
       </Representation>
       ...
     </AdaptationSet>
     <AdaptationSet id="1" mimeType="audio/mp4" ...>...</AdaptationSet>
     ...
   </Period>
   <Period id="adbreak-1" start="PT86703757.622S" xlink:href="https://example.com/manifests/xlink/1?live=60.06" xlink:actuate="onRequest">
     <AdaptationSet id="2" mimeType="video/mp4" ...>
       <SegmentTemplate timescale="90000" presentationTimeOffset="944629008" media="..." initialization="..." ...>
         <SegmentTimeline>
           <S t="944629008" d="360360" r="14"/>
         </SegmentTimeline>
       </SegmentTemplate>
       <Representation id="video-1" ...>
         ....
       </Representation>
       ...
     </AdaptationSet>
     <AdaptationSet id="1" mimeType="audio/mp4" ...>...</AdaptationSet>
     ...
```

```
</Period>    1002
   <Period id="content-2" start="PT86703817.682S" ...>
      <AdaptationSet id="2" mimeType="video/mp4" ...>
         <SegmentTemplate timescale="90000" presentationTimeOffset="950034408" media="..." initialization="..." ...>
            <SegmentTimeline>
               <S t="950034408" d="360360" r="1"/>
            </SegmentTimeline>
         </SegmentTemplate>
         <Representation id="video-1" ...>
            ....
         </Representation>
         ...
      </AdaptationSet>
      <AdaptationSet id="1" mimeType="audio/mp4" ...>...</AdaptationSet>
      ...
   </Period>
</MPD>
```

FIG. 10B

```
<?xml version="1.0" encoding="UTF-11" standalone="yes"?>
<MPD xmlns="urn:mpeg:dash:schema:mpd:2011" xmlns:xlink="http://www.w3.org/1999/
xlink" ... type="dynamic" minimumUpdatePeriod="PT3.0S" availabilityStartTime="2017-05-
01T07:00:00+00:00" ...>
   <Period id="content-1" start="PT116703733.5911S" ...>
      <AdaptationSet id="2" mimeType="video/mp4" ...>
        <SegmentTemplate timescale="90000" presentationTimeOffset="94246611411"
media="..." initialization="..." ...>
           <SegmentTimeline>
              <S t="94246611411" d="360360" r="5"/>
           </SegmentTimeline>
        </SegmentTemplate>
        <Representation id="video-1" ...>
           ....
        </Representation>
        ...
     </AdaptationSet>
     <AdaptationSet id="1" mimeType="audio/mp4" ...>...</AdaptationSet>
     ...         1102-1
   </Period>
   <Period id="remote-1-1-1" duration="PT30.03S" ...>
      <AdaptationSet mimeType="video/mp4" ...>
         <Representation id="video-1" ...>...</Representation>
         ...
      </AdaptationSet>
      <AdaptationSet mimeType="audio/mp4" ...>
         <Representation id="audio-1" ...>...</Representation>
         ...
      </AdaptationSet>
      ...
   </Period>   1102-2
   <Period id="remote-1-1-2" duration="PT30.03S" ...>
      <AdaptationSet mimeType="video/mp4" ...>
         <Representation id="video-1" ...>...</Representation>
         ...
      </AdaptationSet>
      <AdaptationSet mimeType="audio/mp4" ...>
         <Representation id="audio-1" ...>...</Representation>
         ...
      </AdaptationSet>
      ...
```

FIG. 11A

```
</Period>
    <Period id="content-2" start="PT86703817.682S" ...>
        <AdaptationSet id="2" mimeType="video/mp4" ...>
            <SegmentTemplate timescale="90000" presentationTimeOffset="950034408" media="..." initialization="..." ...>
                <SegmentTimeline>
                    <S t="950034408" d="360360" r="1"/>
                </SegmentTimeline>
            </SegmentTemplate>
            <Representation id="video-1" ...>
                ....
            </Representation>
        ...
        </AdaptationSet>
        <AdaptationSet id="1" mimeType="audio/mp4" ...>...</AdaptationSet>
        ...
    </Period>
</MPD>
```

FIG. 11B

CLIENT BASED STORAGE OF REMOTE ELEMENT RESOLUTIONS

CROSS REFERENCE TO RELATED APPLICATIONS

Pursuant to 35 U.S.C. § 119(e), this application is entitled to and claims the benefit of the filing date of U.S. Provisional App. No. 62/983,358 filed Feb. 28, 2020, the content of which is incorporated herein by reference in its entirety for all purposes.

BACKGROUND

Live streaming requires continuous delivery of segments to clients using a media presentation description. Clients acquire segment information via polling protocols. For example, different streaming protocols may be used, such as Dynamic Adaptive Streaming over HTTP (DASH) and Hypertext Transfer Protocol (HTTP) live streaming (HLS). To enable features such as program start over, digital video recorder (DVR) windows, and seamless rollover, servers continually send updates to a media presentation description that includes all known stream information from the time the client joined the stream. The new media presentation description includes some new information for additional segments, but also includes all the previous information that was sent, such as stream initialization information and the previous segments.

The media presentation description may also include information for supplemental content, such as advertisements, that can be inserted into the media presentation. Different methods may be used to insert the supplemental content into the stream. For example, Server-Guided Ad Insertion (SGAI) is an ad serving architecture that describes ad opportunities within the media presentation prior to the stream reaching to the client, but has the client resolve the opportunities as needed to complete the presentation timeline. This type of insertion may be enabled by the update and remote resolution mechanics of the protocol.

In a presentation, such as a live presentation, when a client receives each new manifest, the previously resolved instances of supplemental content are removed from the new manifest. Thus, the client needs to re-resolve each opportunity that is in the new manifest. As the live presentation proceeds down a presentation timeline, the number of opportunities increase and the re-resolution of all the opportunities each time a new manifest is received wastes resources at the client and causes significant overhead. Also, the re-resolution of the opportunities may be handled as new responses for each resolution. This would be an inconsistent state representation during normal playout. That is, the re-resolution of older opportunities may cause problems during the playout. For example, if an update to a manifest is received while a client is playing supplemental content for an opportunity, that opportunity may be re-resolved in the middle of the playback and cause playback issues. For example, the current supplemental content being played may be stopped and another instance of supplemental content may be started.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 3A and 3B depict an example of an initial manifest presentation description according to some embodiments.

FIG. 6 depicts an example of a resolution for two periods according to some embodiments.

FIG. 7 depicts another example of data structure with the information for the periods according to some embodiments.

FIGS. 8A and 8B depict an example of the manifest presentation description after insertion of the resolution results according to some embodiments.

FIGS. 10A and 10B depict an example of an update of the manifest presentation description according to some embodiments.

FIGS. 11A and 11B depict an example of the manifest presentation description after insertion of the information for the resolutions according to some embodiments.

DETAILED DESCRIPTION

Figure 1:
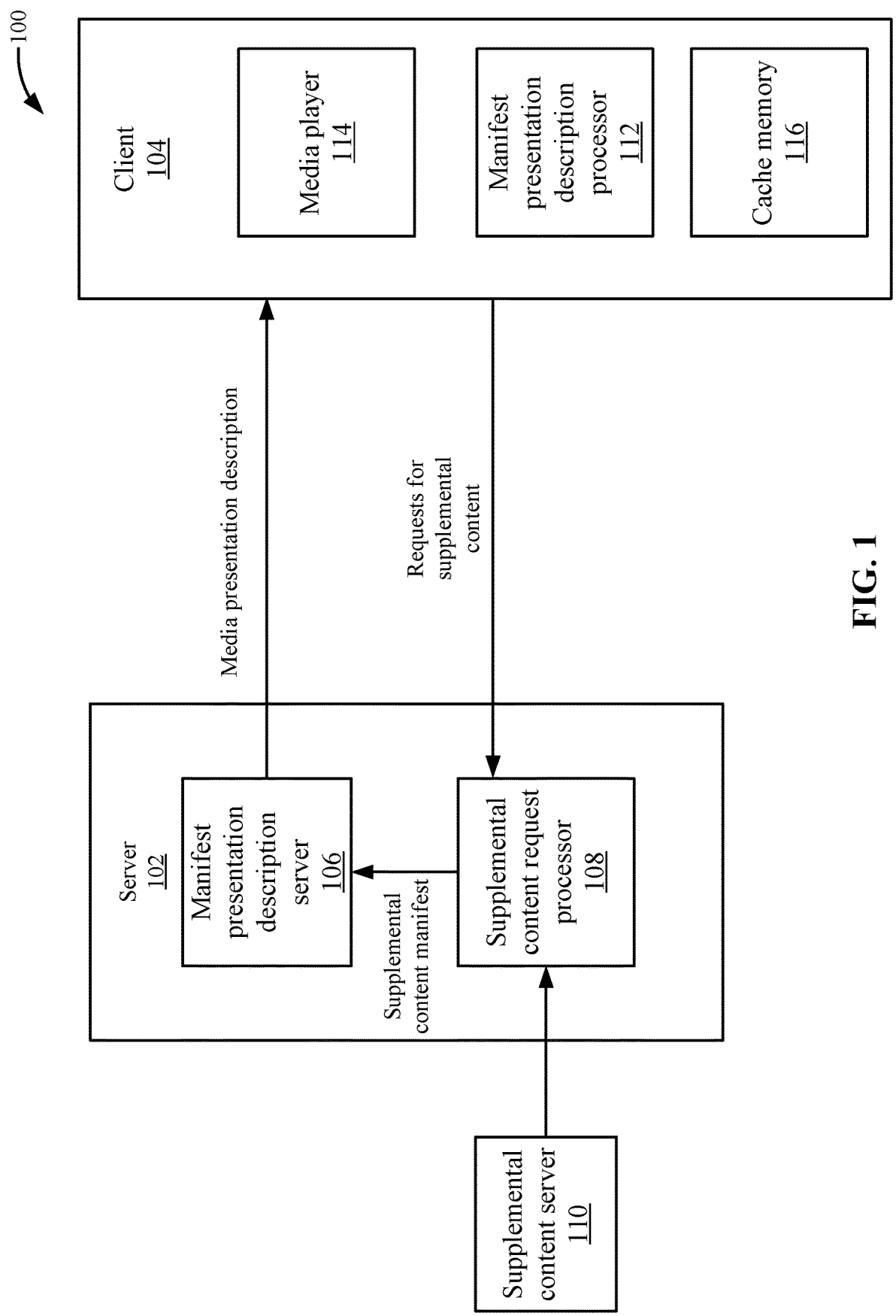
FIG. 1 depicts a simplified system for performing dynamic content replacement according to some embodiments.

Described herein are techniques for a content delivery system. In the following description, for purposes of explanation, numerous examples and specific details are set forth to provide a thorough understanding of some embodiments. Some embodiments as defined by the claims may include some or all of the features in these examples alone or in combination with other features described below, and may further include modifications and equivalents of the features and concepts described herein.

Dynamic content replacement allows a video delivery system to dynamically insert supplemental content into a content stream, such as a live stream or a video on demand stream. The supplemental content, such as advertisements, may be content that is different from the main content in the media presentation currently being sent to a client. For example, supplemental content may be advertisements that are inserted into a media presentation. Other supplemental content may be appreciated, such as content that recommends other media presentations being offered on the video delivery system, network identification bumpers, emergency alerts, breaking news alerts, stream source switches, and user choice based content replacement ("choose your own adventure" type content).

Dynamic content replacement may be the process of resolving opportunities that are included at a point in the stream. The resolution happens while watching the stream, but before the point of an opportunity to insert supplemental content is reached for playout at the client. The client can resolve the opportunities by dynamically requesting supplemental content for the opportunities when needed. In some embodiments, the resolution may replace placeholder opportunities, such as opportunities that do not yet have supplemental content selected. For example, in a live stream, the client may resolve opportunities before reaching the opportunities to receive supplement content. In some embodiments, dynamic content replacement may resolve the opportunities remotely using a server. The server may select the supplemental content for each opportunity. In some embodiments, the server determines supplemental content that is targeted per user.

A manifest presentation description is used to describe the segments of the main content and also describes opportunities for supplemental content. As discussed above, the client may receive updates to the manifest presentation description that include all the previous opportunities that need to be resolved. That is, even if the client previously resolved some opportunities, the supplemental content for those previously resolved opportunities may not be included in the updated manifest presentation description. Instead of forcing the client to re-resolve all the opportunities, the client uses a data structure, such as a table, that is stored in memory to avoid re-resolving all the opportunities. For example, the data structure stores identifiers for opportunities found in the manifest presentation description and information for corresponding supplemental content that was previously determined for the respective opportunities. When a client receives each new manifest presentation description that removes the previously resolved instances of supplemental content, the client can retrieve the supplemental content from the data structure instead of re-resolving the opportunities. This saves computing resource usage as the client does not need to re-resolve opportunities that have already been resolved for the manifest presentation description. The act of using the information from storage is less computing resource intensive than sending multiple requests and processing the multiple responses. Further, bandwidth usage is reduced because requests and responses are not sent over a network. Also, the use of the data structure to not re-resolve opportunities separates the triggering of new resolution opportunities from the previously triggered resolution opportunities. Accordingly, the client can maintain a single consistent presentation timeline across multiple updates and still allow for new resolution scenarios to be used.

System Overview

FIG. 1 depicts a simplified system 100 for performing dynamic content replacement according to some embodiments. System 100 includes a server 102 and a client 104. Although one instance of server 102 and client 104 are shown, multiple instances of server 102 and client 104 may be used.

Server 102 may deliver media presentations to client 104. Server 102 may be part of a content delivery network (CDN), which may deliver media presentations and other content using multiple devices. When server 102 is discussed, the functionality may be performed by multiple devices in the CDN, and is not limited to server 102. In one example, server 102 stores various media presentations, such as video (e.g., a title or show) that has been (or will be) encoded in multiple bitrates. For example, a media presentation has been divided into segments that an encoder encodes at multiple bitrates, from high to low. A media presentation is stored in different versions (i.e., bitrates) as media presentation #1 (high bitrate), media presentation #2 (medium bitrate), . . . , and media presentation #N (low bitrate). The different bitrates provide videos at different levels of quality. For example, a higher bitrate video will be of a higher quality than the medium bitrate, and the medium bitrate of a higher quality than the lower bitrate. Although these encodings are described, various embodiments may include different encodings at any number of bitrates.

Client 104 may include various user devices, such as cellular phones, set top boxes, streaming devices, personal computers, tablet computers, etc. Client 104 may include a media player 114 that can play the media presentation. For example, media player 114 may play video and/or audio from the media presentation. Client 104 includes a manifest presentation description processor 112 that processes manifest presentation descriptions and performs the remote resolution described herein.

A transport mechanism, such as a protocol specification including DASH (also known as MPEG-DASH) or HLS, may be used to transport information for segments of the media presentation from server 102 to client 104. Server 102 includes a manifest presentation description server 106 and a supplemental content request processor 108. Although manifest presentation description server 106 and a supplemental content request processor 108 are shown in the same server 102, it is noted they could be located in different devices. Also, although described separately, manifest presentation description server 106 and/or supplemental content manifest server 108 do not need to be separate entities and the functions may be performed by a single entity.

Manifest presentation description server 106 may send manifest presentation descriptions to a client 104. Client 104 receives the media presentation descriptions from server 102. Using the media presentation descriptions, client 104 (e.g., media player 114) may request segments of the media presentation from server 102. While receiving the segments of the media presentation, client 104 can evaluate the bandwidth in which client 104 receives the segments. One evaluation that client 104 may perform is to measure the amount of the media presentation (e.g., video) received over a period of time to estimate the available bandwidth. Depending on the available bandwidth, client 104 may make decisions on which bitrate (or version) of the media presentation to request. For example, client 104 determines which version of a media presentation to request for a segment of the media presentation, where the versions may include different bitrates.

In addition to requesting different bitrates of the media presentation, client 104 may send requests to resolve supplemental content opportunities in the manifest presentation descriptions to supplemental content request processor 108 during playback of the media presentation. Then, supplemental content request processor 108 resolves the opportunities by determining which supplemental content to insert in the manifest presentation description. In the process, supplemental content request processor 108 may communicate with a supplemental content server 110 to determine the supplemental content. In some embodiments, content server 110 may identify supplemental content that can be dynamically inserted into the stream in the supplemental content opportunities, such as to replace default content (e.g., default ads), to resolve placeholder opportunities, or to re-resolve previous supplemental content opportunities in the stream.

The above process may be referred to as Server-Guided Ad Insertion (SGAI) where server 102 fully describes ad opportunities within the media presentation prior to the stream reaching client 104. Some embodiments may be used with other insertion schemes, such as client-side ad insertion (CSAI), which is an ad serving architecture where the client application handles the direct communication with server 102 and has ad content played within a secondary player while the main content is stopped. Client 104 resolves the opportunities as needed to complete the media presentation timeline. The use of remote resolution and update techniques as described allow a cached and common main content presentation at server 102 for multiple clients 104 to become a unique and personalized stream for each client 104. These features allow presentations to be authored with main content and resolution opportunity points that would be expanded by client 104 in asynchronous calls back to server 102 based on controlling cues. Note that the functionality is described as part of period group in DASH, but this could be generalized to other manifest and remote element resolution forms as well as additional element types within DASH or other protocols, such as HLS. For example, the following functionalities may be used by a client 104 to use the dynamic resolution, but it is not necessary for all of them to exist:

Functionality 1: A presentation is able to explicitly describe where an opportunity exists in a presentation timeline and the timeline boundaries of the opportunity if fixed. The presentation timeline is what client 104 follows to request content.

Functionality 2: A presentation is able to describe where an opportunity can be resolved from.

Functionality 3: An opportunity resolution has a way to carry client sourced information that is used during resolution processes.

Functionality 4: The resulting supplemental content of a resolution is self-contained to allow for direct inclusion in the main presentation.

Functionality 5: The presentation processing model defines how the presentation timeline is adjusted/extended to accommodate the resolution result for the lifetime of the presentation.

With respect to functionality #1, periods describe where an opportunity exists as a period can define both the point in time and, in the case of default main content, the length of the opportunity within the main presentation content timeline. The period's self-contained nature makes insertion/replacement operations possible in the dynamic resolution. These effects on the presentation timeline define the timing nature of the period within the timeline. Periods are self-contained by marking the beginning and end of the period thus making them capable of being stand-alone containers for inserted content. These containers can be mixed and matched as necessary to fulfill the ordering and numbering requirements of the supplemental content, such as the advertisement creative.

For functionality #2, manifest presentation description may provide a remote locator, such as a uniform resource locator (URL), that provides an opportunity to resolve the opportunity for supplemental content using the link. For example, a link with the @xlink:href attribute can be resolved using the link.

For functionality #3, client 104 can send client state to the server dynamically. For example, client 104 can send client state to server 102 and receive client specific content dynamically.

For functionality #4, the period is designed to be replaced by an instance of supplemental content.

For functionality #5, changes to the presentation description may adjust or extend the presentation timeline to accommodate the inserted supplemental content for the lifetime of the presentation.

A specification, such as XML Linking Language (XLink), may be used to perform the remote resolution. Although XLink is described, other protocols may be used that allow remote resolution. Remote resolution may be a resolution that is performed outside of client 104 to determine which supplemental content should be inserted into opportunities. A resolution and replacement mechanism may be used to combine remote elements with the main presentation. A first attribute may be used to describe a link that points to a location where the supplemental content can be retrieved. A second attribute describes when resolution of the supplemental content should be performed when processing the manifest presentation description. For example, XLink may include attributes that may be used, such as @xlink:href and @xlink:actuate. The attribute @xlink:href describes a link, such as a uniform resource identifier (URI), that points to a location where the supplemental content can be retrieved. The attribute @xlink:actuate describes when resolution of the supplemental content should be performed when processing the manifest presentation description. Other attributes may also be used.

The resolution may be triggered when a condition associated with the second attribute value is met by the client player state. For example, a value, such as "onLoad", signifies that the information for supplemental content should be requested when the original manifest presentation description is loaded. Also, a value, such as "onRequest", signifies the information for the supplemental content should be requested when the information becomes relevant to the manifest presentation description, such as when a period will be encountered during playback of the stream. For example, the information may become relevant X seconds before the opportunity, X periods before, or any time before. The response elements of the resolution fully replace the original elements in the manifest presentation description with the remote resolution attributes. Client 104 reevaluates the in-memory manifest when the update occurs to request segments of the media presentation. Manifest presentation description server 106 may create the supplemental content manifest using the supplemental content identified by supplemental content request processor 108 and send the supplemental content manifest to client 104.

In a presentation, such as a live stream, client 104 may receive multiple updates to the manifest presentation description from manifest presentation description server 106. Each update may include the resolution opportunities for the entire presentation. That is, even if client 104 had previously resolved opportunities in the manifest presentation description, the supplemental content for those resolution opportunities do not appear in the update of the manifest presentation description. One reason the supplemental content for the resolution opportunities do not exist in the update is that server 102 does not save the resolution results of supplemental content for each client 104. Server 102 may not save the resolutions because each client 104 may have different resolutions and the amount of data that needs to be saved may be large and hard to scale. Accordingly, server 102 may be stateless and not keep track of the supplemental content for the resolutions for client 104. Rather, client 104 conventionally would have had to re-resolve all the resolution opportunities in the manifest presentation description.

Client 104 includes storage, such as a cache memory 116, that stores information for the previous resolutions. For example, once manifest presentation description processor 112 resolves an opportunity, manifest presentation description processor 112 may store information for the supplemental content for an identifier of the resolution opportunity in a data structure in cache memory 116. When processing an update to the manifest presentation description, manifest presentation description processor 112 may identify supplement content for previously resolved opportunities in the data structure and insert information for the previous resolutions in an in-memory manifest presentation description. The in-memory manifest presentation description may be a version of the manifest presentation description that is stored at client 104. For example, each time that client 104 receives an update to the manifest presentation description, client 104 stores the update in memory. Then, client 104 inserts the previous resolutions in the in-memory manifest presentation description by locating the identifiers in the in-memory manifest presentation description and replacing the opportunities with information for the supplement content that was previously resolved. Accordingly, manifest presentation description processor 112 does not need to re-resolve these opportunities. Then, manifest presentation description processor 112 may resolve any opportunities that do not have corresponding entries in the data structure.

Figure 2:
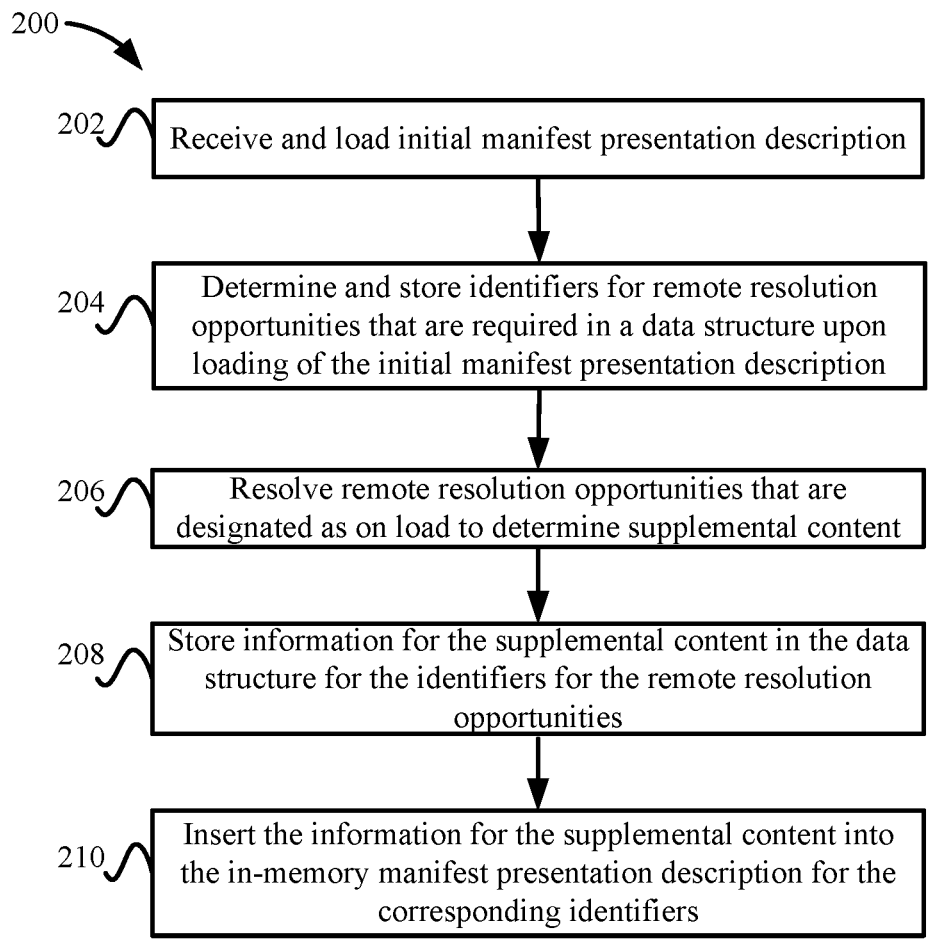
FIG. 2 depicts a simplified flowchart of a method for processing an initial manifest presentation description according to some embodiments.

FIG. 2 depicts a simplified flowchart of a method for processing an initial manifest presentation description at client 104 according to some embodiments. At 202, manifest presentation description processor 112 receives and loads the initial manifest presentation description. The manifest presentation description may be the first one received by client 104 after a playback request for a video or may be a first one that requires resolution.

At 204, manifest presentation description processor 112 determines and stores identifiers for remote resolution opportunities that are required in the data structure upon loading of the initial manifest presentation description. FIGS. 3A and 3B depict an example of an initial manifest presentation description according to some embodiments. Although this example is described for discussion purposes, it will be understood that different protocols may use different formats. At 302, manifest presentation description includes an opportunity with a period id of "adbreak-1". At 304, the opportunity includes the attribute of "xlink:href="https://example.com/manifests/xlink/1?live=60.06 "xlink:actuate="onRequest"". The link indicates a location "https://example.com/manifests/xlink/1?live=60.06" to resolve the opportunity to receive supplemental content. The resolution should be performed on request as indicated by ""xlink:actuate="onRequest", and not on load. On load resolution is performed when the manifest is received. The on request processing is performed when a condition is met and will be described below. Other methods of resolving opportunities may also be appreciated. The opportunity for resolution is also surrounded by periods that define main content of the presentation at 306-1 and 306-2. These periods include information that can be used to request segments of the main content of the presentation. The opportunity at 302 is inserted in between the playback of the main content at 306-1 and 306-2.

At 206, manifest presentation description processor 112 resolves remote resolution opportunities that are designated as on load to determine supplemental content. In this example, there are no on load opportunities, but the on load opportunities would be in a similar format to the on request opportunities. For example, an on load opportunity may be "xlink:href="https://example.com/manifests/xlink/1?live=60.06 "xlink:actuate="onLoad"". The link indicates a location "https://example.com/manifests/xlink/1?live=60.06" to resolve the opportunity to receive supplemental content. The resolution should be performed on load as indicated by ""xlink:actuate="onLoad"". To resolve the on load opportunities, manifest presentation description processor 112 may send a request to supplemental content request processor 108 using the link. Manifest presentation description processor 112 would then receive information for the supplemental content from manifest presentation description server 106.

At 208, manifest presentation description processor 112 stores information for the supplemental content in the data structure for the identifiers for the remote resolution opportunities. For example, manifest presentation description processor 112 inserts the identifier of "ad-break-1" in the data structure if this is an on load opportunity. At 210, manifest presentation description processor 112 inserts the information for the supplemental content into the in-memory manifest presentation description for the corresponding identifiers. For example, manifest presentation description processor 112 inserts links to the supplemental content that were received as resolved opportunities.

Figure 4:
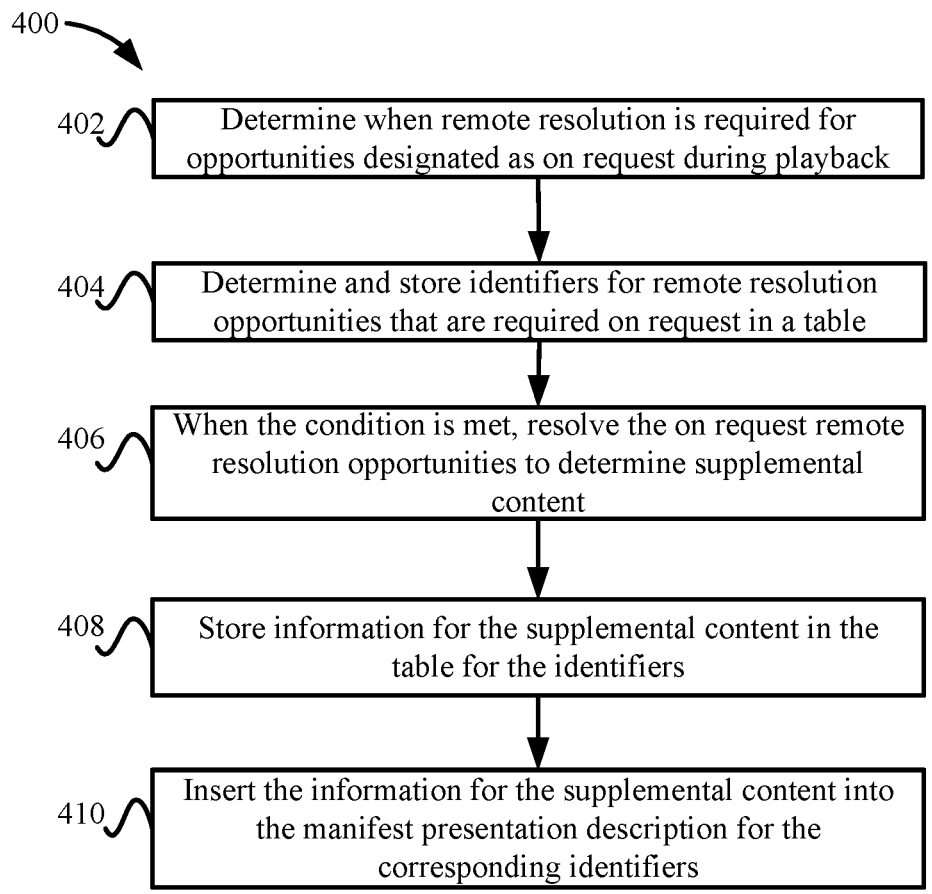
FIG. 4 depicts a simplified flowchart of a method for resolving opportunities on request according to some embodiments.

FIG. 4 depicts a simplified flowchart 400 of a method for processing on request resolution opportunities according to some embodiments. As mentioned above, the on request opportunities may occur during playback of the video. At 402, manifest presentation description processor 112 determines when remote resolution is required for opportunities designated as on request during playback.

Figure 5:
FIG. 5 depicts an example of a data structure according to some embodiments.

At 404, manifest presentation description processor 112 determines and stores identifiers for remote resolution opportunities that are required on request in the data structure. The storing of the identifiers may be performed upon receiving the initial manifest presentation description with the remote resolution opportunities. Also, the storing of the identifiers may be performed when the condition is met for the on request resolution. FIG. 5 depicts an example of a data structure 500 according to some embodiments. At 502, data structure 500 includes a column for identifiers, and at 504, data structure 500 includes a column for resolution results. In this case, manifest presentation description processor 112 stores the identifier "adbreak-1" at 506 for the period in the data structure 500. The identifier identifies the on request opportunity in the manifest presentation description.

Referring back to FIG. 4, at 406, when the condition is met for the on request remote resolution opportunities, manifest presentation description processor 112 resolves the on request remote resolution opportunities to determine supplemental content. FIG. 6 depicts an example of a resolution for two periods according to some embodiments. In this example, the opportunity for "adbreak-1" is resolved to two periods or two instances of supplemental content, but does not need to be resolved to two periods. In the manifest that is received from server 102, the period length is 60 seconds. Supplemental content request processor 108 may resolve the 60 seconds with two 30 second instances of content (e.g., as described herein), one 60 second instance of supplemental content, four 15 second instances of supplemental content, etc. In this case, a first period for a first instance of supplemental content is shown at 602-1 and a second period for a second instance of supplemental content is shown at 602-2. The first period is identified by the identifier "remote-1-1-1" and the second period is identified by the identifier "remote-1-1-2". Each period describes a different instance of supplemental content and how to retrieve the respective instance. For instance, a link to retrieve the video and audio of each respective instance may be included for each respective period.

Referring back to FIG. 4, at 408, manifest presentation description processor 112 stores information for the supplemental content in the data structure for the identifiers. FIG. 7 depicts another example of data structure 500 with the information for the periods according to some embodiments. At 702-1, manifest presentation description processor 112 has inserted information for the first instance of supplemental content with an identifier of "remote-1-1-1". Also, at 702-2, manifest presentation description processor 112 has inserted information for the first instance of supplemental content with an identifier of "remote-1-1-2". Other information for retrieving the instances may also be stored in the data structure or elsewhere.

Referring back to FIG. 4, at 410, manifest presentation description processor 112 inserts the information for the supplemental content into the in-memory manifest presentation description for the corresponding identifiers in the in-memory manifest presentation description that is stored at client 104. Client 104 uses the in-memory manifest presentation description to play the media presentation. FIGS. 8A and 8B depict an example of the manifest presentation description after insertion of the resolution results according to some embodiments. Manifest presentation description processor 112 inserts the information for the supplemental content at 802-1 and 802-2, respectively. The supplemental content is in between two periods of main content from the video with the identifiers of "content-1" at 804-1 and "content-2" at 804-2. Client 104 may use the information in the manifest presentation description to playback the main content and the supplemental content. For instance, client 104 uses links in the periods of the manifest presentation description to request the main content or the supplemental content when the periods are resolved in the playback timeline.

Processing of Updates to the Manifest Presentation Description

At some point, client 104 receives an update to the manifest presentation description. The update may include new information, such as a new period. For example, as a live stream continues, additional content for the media presentation is added for client 104 to request. The additional content may be encompassed in periods in the manifest presentation description and may represent main content or opportunities to insert supplemental content. Also, if the update time occurs and there is no additional content available, the update may not include any new information. However, in both cases, the update includes the original remote resolution signaling and not the supplemental content the client 104 has previously resolved.

Figure 9:
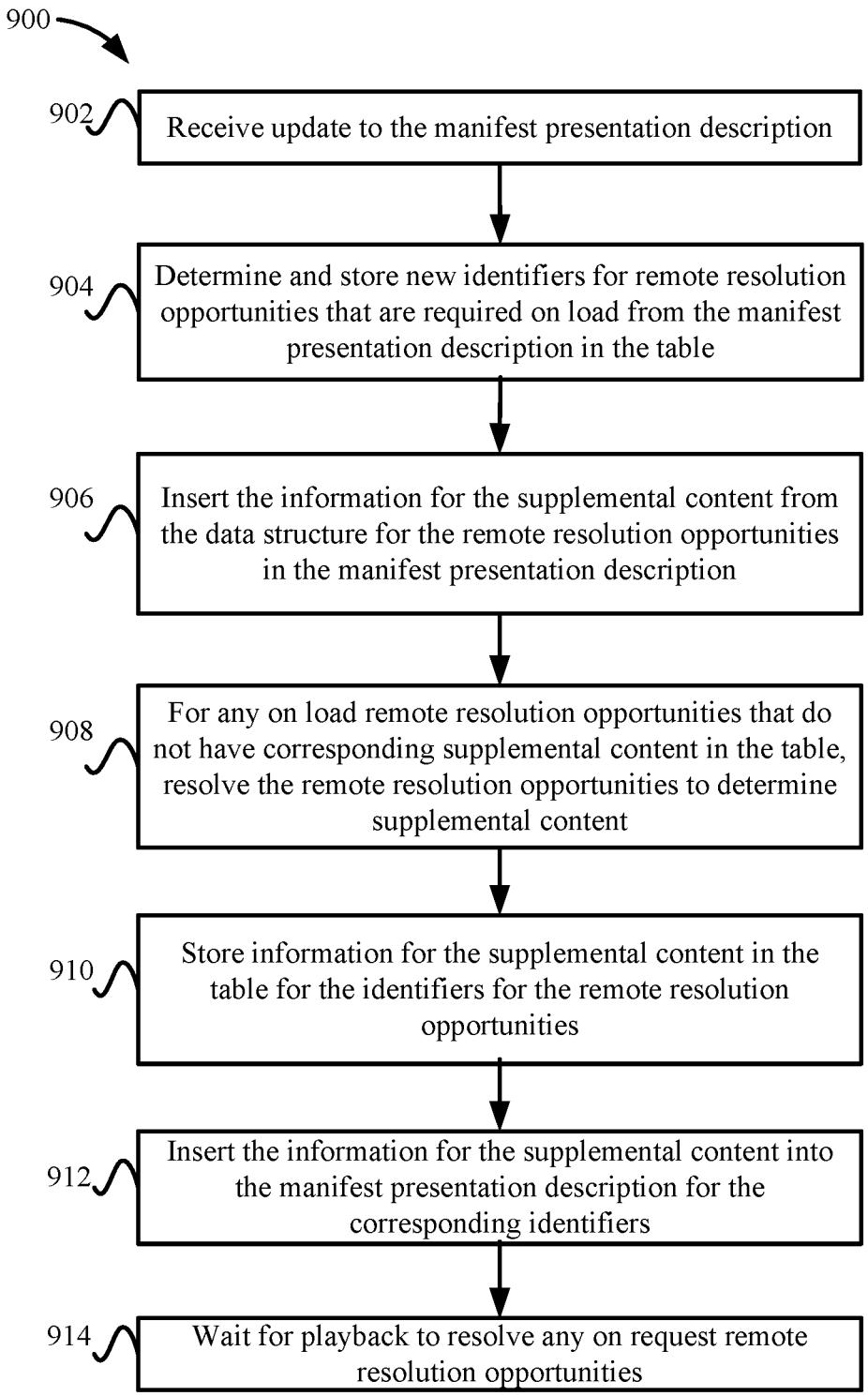
FIG. 9 depicts a simplified flowchart of a method for processing updates to the manifest presentation description according to some embodiments.

FIG. 9 depicts a simplified flowchart 900 of a method for processing updates to the manifest presentation description according to some embodiments. At 902, client 104 receives an update to the manifest presentation description. The update may include additional periods as discussed above and also does not include information for previously resolved periods. Thus, the update is different from the manifest presentation description that is stored in-memory at client 104. When a full manifest presentation description update occurs, client 104 may completely clear the in-memory manifest from memory and manifest presentation description processor 112 stores the newly loaded manifest in its place. In this case, the new in-memory manifest presentation description has unresolved opportunities as discussed above.

FIGS. 10A and 10B depict an example of an update of the manifest presentation description according to some embodiments. In the manifest presentation description, at 1000, the period for "adbreak-1" requires remote resolution to determine supplemental content for the opportunity. That is, the information included at 1000 is similar to the information found in a previous manifest presentation description in FIG. 3A at 302. This manifest presentation description does not include the resolved opportunities that are shown at 802-1 and 802-2 in FIG. 8A.

Also, this manifest presentation description has added a new segment to the second content period identified as "content-2" at 1002. The new segment is identified by the addition of the value "r=1" to the S element depicted within period "content-2", where the r attribute signals the number of consecutive segments that exist following the described segment with duration equivalent to the existing segments duration signaled by the d attribute. In this example "r=1" indicates there is one additional segment following the described segment with the same duration of "360360", a further update may increase the r value again, add a new S element with a different duration (d attribute) or reference time (t attribute), or add an entirely new period element.

Referring back to FIG. 9, manifest presentation description processor 112 then searches the data structure for identifiers found in the manifest presentation description. At 904, manifest presentation description processor 112 determines and stores new identifiers for remote resolution opportunities that are required on load from the manifest presentation description in the data structure. These are for new resolution opportunities that have not been previously encountered in prior manifest presentation descriptions. In this case, manifest presentation description processor 112 does not find corresponding identifiers from resolution opportunities in the manifest presentation description in the data structure.

For identifiers in the data structure that correspond to on load or on request remote resolution opportunities in the manifest presentation description, at 906, manifest presentation description processor 112 inserts the information from the data structure for the supplemental content for the remote resolution opportunities in the in-memory manifest presentation description. Manifest presentation description processor 112 thus does not re-resolve these opportunities to re-determine supplemental content. The on request and on load opportunities were opportunities that were previously resolved on request, such as the condition was previously met and manifest presentation description processor 112 resolved the on request and on load opportunities and stored information for the supplemental content in the data structure. Rather, manifest presentation description processor 112 retrieves the information from the data structure and inserts the information in the in-memory manifest presentation description.

At 908, for any remaining on load remote resolution opportunities that do not have corresponding supplemental content in the data structure, manifest presentation description processor 112 resolves the remote resolution opportunities to determine supplemental content. These on load opportunities may be the new identifiers that were added to the data structure at 904. For example, manifest presentation description processor 112 may send requests for resolution for opportunities that do not have information for supplemental content stored in the data structure. These opportunities may be newly inserted into the manifest presentation description.

After receiving information for the supplemental content, at 910, manifest presentation description processor 112 stores the information for the supplemental content for the remote resolution opportunities in the data structure in association with the identifiers.

At 912, manifest presentation description processor 112 inserts the information for the supplemental content into the in-memory manifest presentation description for the corresponding identifiers. This updates the in-memory manifest presentation description with the previously resolved opportunities and the newly resolved opportunities. FIGS. 11A and 11B depict an example of the manifest presentation description after insertion of the information for the resolutions according to some embodiments. At 1102-1 and 1102-2, manifest presentation description processor 112 has inserted the information for the previously performed resolutions for the periods with the identifiers "remote-1-1-1" and "remote-1-1-2", respectively. Manifest presentation description processor 112 did not need to perform the remote resolution, however. Rather, manifest presentation description processor 112 used the information found in the data structure instead of contacting server 102 to resolve the opportunity. The information that is inserted in the updated manifest presentation description may be the same as found at 602-1 and 602-2 in FIG. 6.

At 914, manifest presentation description processor 112 waits for playback to resolve any on request remote resolution opportunities that have not been previously resolved. Subsequently, upon a corresponding condition for the resolution opportunity being met, manifest presentation description processor 112 resolves the opportunity and inserts the information for the supplemental content in the data structure and the in-memory manifest presentation description.

The initial manifest presentation descriptions only provide one instance of remote period element(s) in the manifest presentation description, but this is to simplify the overall example, in practice there may be multiple independent remote resolution points throughout a manifest presentation description. Also, for structure representation elements that may appear multiple times in a period have been omitted and attributes non-essential to the idea have been removed to shorten the overall manifest examples. These omissions are indicated by three dots " . . . ".

CONCLUSION

Accordingly, client 104 avoids re-resolution of opportunities that have already been resolved. Storing information for the opportunities for a specific client 104 maintains the resolution state at the client, and client 104 can insert the previous resolutions in an update to a manifest.

EXAMPLE EMBODIMENTS

In some embodiments, a method comprising: receiving, by a computing device, a manifest presentation description for a media presentation, the manifest presentation description including an opportunity that requires resolution to determine supplemental content for the opportunity; sending, by the computing device, a request to resolve the opportunity, wherein information for the supplemental content that is received from the request is inserted in an instance of the media presentation description; storing, by the computing device, the information for the supplemental content in association with an identifier for the opportunity; receiving, by the computing device, an update to the manifest presentation description, wherein the update to the manifest presentation description includes the opportunity that requires resolution to determine supplemental content for the opportunity; and retrieving, by the computing device, the information for the supplemental content that was stored in association with the identifier for the opportunity and inserting the information for the supplemental content into the instance of the update to the manifest presentation description.

In some embodiments, the method further comprising: storing the instance of the manifest presentation description; and inserting the information for the supplemental content in the opportunity in the instance of the manifest presentation description.

In some embodiments, the method further comprising: using the information for the supplemental content to request the supplemental content during playback of the media presentation.

In some embodiments, receiving the manifest presentation description comprises: determining that the opportunity should be resolved upon receiving the manifest presentation description; and sending a request to resolve the opportunity upon receiving the manifest presentation description.

In some embodiments, sending the request to resolve the opportunity comprises: determining that the opportunity should be resolved at a later time after receiving the manifest presentation description; and upon a condition being met after receiving the manifest presentation description, sending a request to resolve the opportunity.

In some embodiments, the condition is met after a portion of the media presentation is played upon receiving the manifest presentation description.

In some embodiments, the information for the supplemental content and the identifier are stored in a data structure that persists after receiving the update to the manifest presentation description.

In some embodiments, the method further comprising: inserting the information for the supplemental content in the instance of the update of the manifest presentation description without sending a request for resolution of the opportunity.

In some embodiments, the request to resolve the opportunity is sent to a remote device.

In some embodiments, the update to the manifest presentation description does not include the information for the supplemental content that is received from sending the request.

In some embodiments, the method further comprising: reviewing the update to the manifest presentation description to determine the identifier is associated with the opportunity; and determining that the opportunity has been resolved previously based on the identifier being stored in the data structure.

In some embodiments, the method further comprising: sending a new request to resolve a new opportunity, wherein information for new supplemental content is received from the new request and is inserted in the instance of the update of the media presentation description.

In some embodiments, the instance of the update of the manifest presentation description replaces the instance of the manifest presentation description.

In some embodiments, the method further comprising: storing the instance of the manifest presentation description in memory; inserting the information for the supplemental content in the instance of the manifest presentation description; storing the update of the manifest presentation description in the memory to replace the instance of the manifest presentation description; and inserting the stored information for the supplemental content in the update of the manifest presentation description.

In some embodiments, a non-transitory computer-readable storage medium having stored thereon computer executable instructions, which when executed by a computing device, cause the computing device to be operable for: receiving a manifest presentation description for a media presentation, the manifest presentation description including an opportunity that requires resolution to determine supplemental content for the opportunity; sending a request to resolve the opportunity, wherein information for the supplemental content that is received from the request is inserted in an instance of the media presentation description; storing the information for the supplemental content in association with an identifier for the opportunity; receiving an update to the manifest presentation description, wherein the update to the manifest presentation description includes the opportunity that requires resolution to determine supplemental content for the opportunity; and retrieving the information for the supplemental content that was stored in association with the identifier for the opportunity and inserting the information for the supplemental content into the instance of the update to the manifest presentation description.

In some embodiments, further operable for: storing the instance of the manifest presentation description; and inserting the information for the supplemental content in the opportunity in the instance of the manifest presentation description.

In some embodiments, the information for the supplemental content and the identifier are stored in a data structure that persists after receiving the update to the manifest presentation description.

In some embodiments, further operable for: inserting the information for the supplemental content in the instance of the update of the manifest presentation description without sending a request for resolution of the opportunity.

In some embodiments, further operable for: storing the instance of the manifest presentation description in memory; inserting the information for the supplemental content in the instance of the manifest presentation description; storing the update of the manifest presentation description in the memory to replace the instance of the manifest presentation description; and inserting the stored information for the supplemental content in the update of the manifest presentation description.

In some embodiments, an apparatus comprising: one or more computer processors; and a computer-readable storage medium comprising instructions for controlling the one or more computer processors to be operable for: receiving a manifest presentation description for a media presentation, the manifest presentation description including an opportunity that requires resolution to determine supplemental content for the opportunity; sending a request to resolve the opportunity, wherein information for the supplemental content that is received from the request is inserted in an instance of the media presentation description; storing the information for the supplemental content in association with an identifier for the opportunity; receiving an update to the manifest presentation description, wherein the update to the manifest presentation description includes the opportunity that requires resolution to determine supplemental content for the opportunity; and retrieving the information for the supplemental content that was stored in association with the identifier for the opportunity and inserting the information for the supplemental content into the instance of the update to the manifest presentation description.

System

Figure 12:
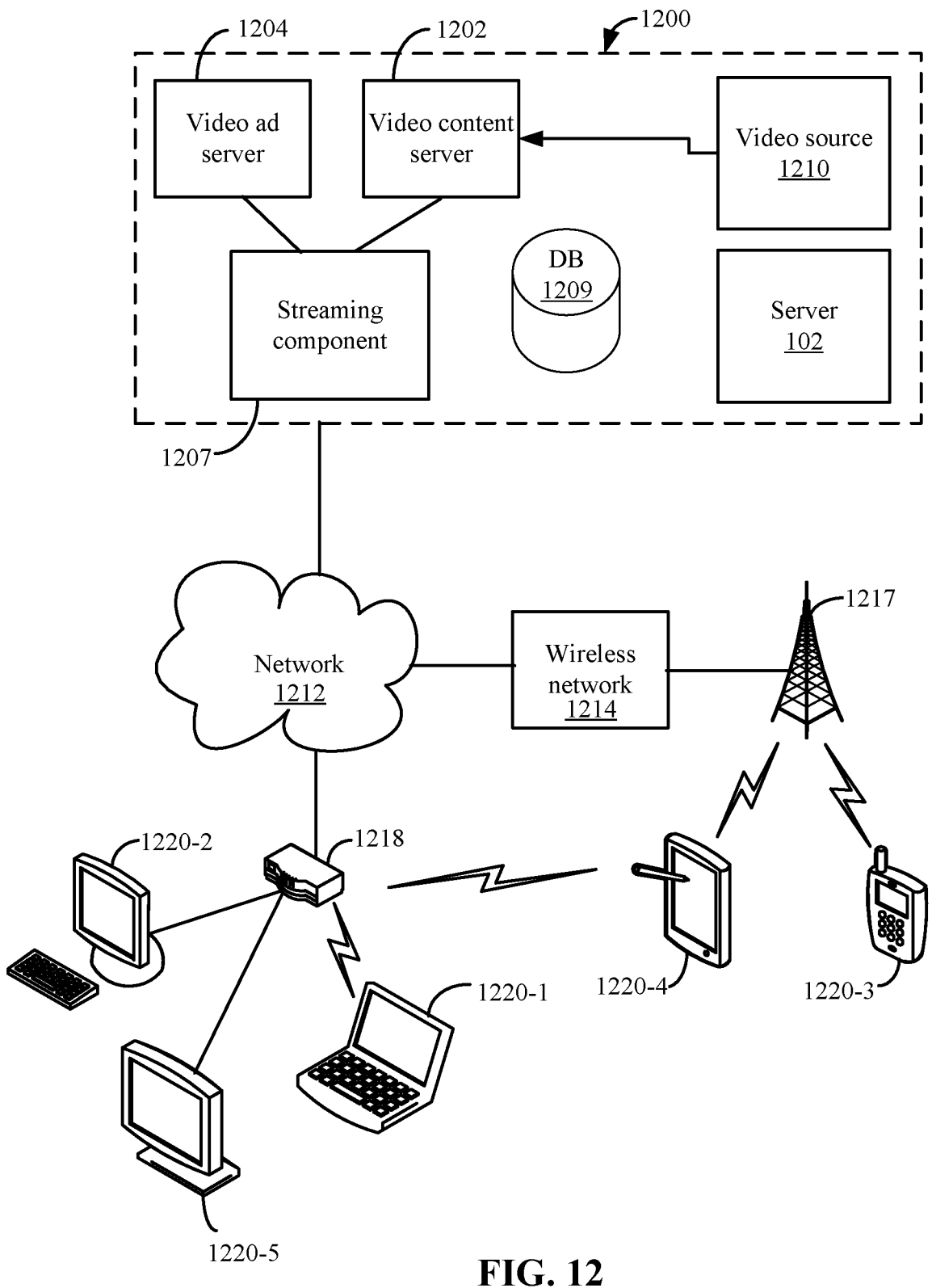
FIG. 12 depicts a video streaming system in communication with multiple client devices via one or more communication networks according to one embodiment.

Features and aspects as disclosed herein may be implemented in conjunction with a video streaming system 1200 in communication with multiple client devices via one or more communication networks as shown in FIG. 12. Aspects of the video streaming system 1200 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1200, video data may be obtained from one or more sources for example, from a video source 1210, for use as input to a video content server 1202. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1200 may include one or more computer servers or modules 1202, 1204, and/or 1207 distributed over one or more computers. Each server 1202, 1204, 1207 may include, or may be operatively coupled to, one or more data stores 1209, for example databases, indexes, files, or other data structures. A video content server 1202 may access a data store (not shown) of various video segments. The video content server 1202 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1204 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1200, a public service message, or some other information. The video advertising server 1204 may serve the video advertising segments as directed by a user interface controller (not shown).

The video streaming system 1200 may further include an integration and streaming component 1207 that integrates video content and video advertising into a streaming video segment. For example, streaming component 1207 may be a content server or streaming media server. A controller (not shown) may determine the selection or configuration of advertising in the streaming video based on any suitable algorithm or process. The video streaming system 1200 may include other modules or units not depicted in FIG. 12, for example, administrative servers, commerce servers, network infrastructure, advertising selection engines, and so forth.

The video streaming system 1200 may connect to a data communication network 1212. A data communication network 1212 may comprise a local area network (LAN), a wide area network (WAN), for example, the Internet, a telephone network, a wireless cellular telecommunications network (WCS) 1214, or some combination of these or similar networks.

One or more client devices 1220 may be in communication with the video streaming system 1200, via the data communication network 1212, wireless cellular telecommunications network 1214, and/or another network. Such client devices may include, for example, one or more laptop computers 1220-1, desktop computers 1220-2, "smart" mobile phones 1220-3, tablet devices 1220-4, network-enabled televisions 1220-5, or combinations thereof, via a router 1218 for a LAN, via a base station 1217 for a wireless cellular telecommunications network 1214, or via some other connection. In operation, such client devices 1220 may send and receive data or instructions to the system 1200, in response to user input received from user input devices or other input. In response, the system 1200 may serve video segments and metadata from the data store 1209 responsive to selection of media programs to the client devices 1220. Client devices 1220 may output the video content from the streaming video segment in a media player using a display screen, projector, or other video output device, and receive user input for interacting with the video content.

Distribution of audio-video data may be implemented from streaming component 1207 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1207 may communicate with client device 1220 using control messages and data messages to adjust to changing network conditions as the video is played. These control messages can include commands for enabling control functions such as fast forward, fast reverse, pausing, or seeking to a particular part of the file at the client.

Since streaming component 1207 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1207 may use TCP-based protocols, such as HTTP and Real Time Messaging Protocol (RTMP). Streaming component 1207 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 13:
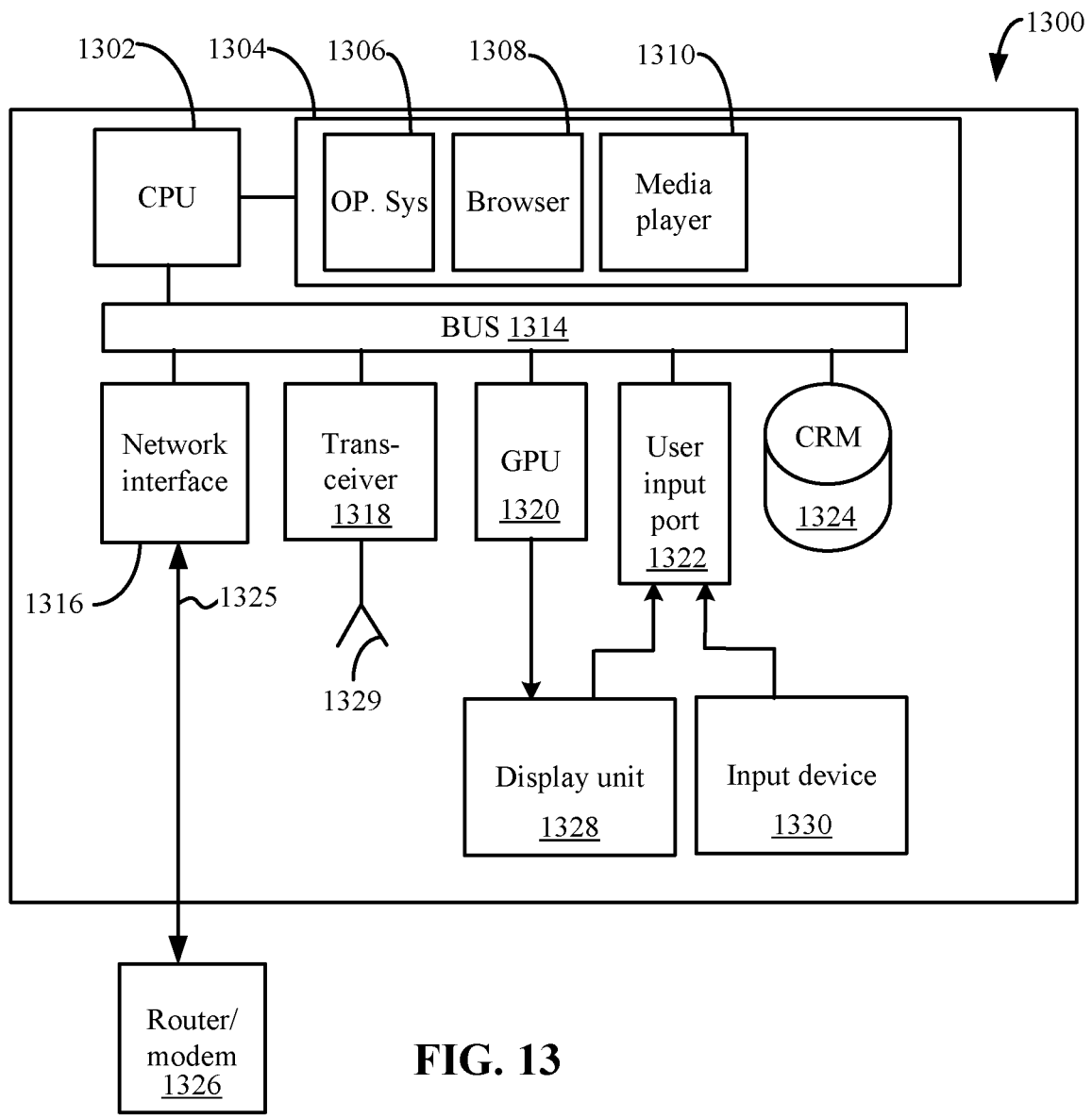
FIG. 13 depicts a diagrammatic view of an apparatus for viewing video content and advertisements.

Referring to FIG. 13, a diagrammatic view of an apparatus 1300 for viewing video content and advertisements is illustrated. In selected embodiments, the apparatus 1300 may include a processor (CPU) 1302 operatively coupled to a processor memory 1304, which holds binary-coded functional modules for execution by the processor 1302. Such functional modules may include an operating system 1306 for handling system functions such as input/output and memory access, a browser 1308 to display web pages, and media player 1310 for playing video. The memory 1304 may hold additional modules not shown in FIG. 13, for example modules for performing other operations described elsewhere herein.

A bus 1314 or other communication component may support communication of information within the apparatus 1300. The processor 1302 may be a specialized or dedicated microprocessor configured or operable to perform particular tasks in accordance with the features and aspects disclosed herein by executing machine-readable software code defining the particular tasks. Processor memory 1304 (e.g., random access memory (RAM) or other dynamic storage device) may be connected to the bus 1314 or directly to the processor 1302, and store information and instructions to be executed by a processor 1302. The memory 1304 may also store temporary variables or other intermediate information during execution of such instructions.

A computer-readable medium in a storage device 1324 may be connected to the bus 1314 and store static information and instructions for the processor 1302; for example, the storage device (CRM) 1324 may store the modules 1306, 1308, 1310 and 1312 when the apparatus 1300 is powered off, from which the modules may be loaded into the processor memory 1304 when the apparatus 1300 is powered up. The storage device 1324 may include a non-transitory computer-readable storage medium holding information, instructions, or some combination thereof, for example instructions that when executed by the processor 1302, cause the apparatus 1300 to be configured or operable to perform one or more operations of a method as described herein.

A communication interface 1316 may also be connected to the bus 1314. The communication interface 1316 may provide or support two-way data communication between the apparatus 1300 and one or more external devices, e.g., the streaming system 1200, optionally via a router/modem 1326 and a wired or wireless connection. In the alternative, or in addition, the apparatus 1300 may include a transceiver 1318 connected to an antenna 1329, through which the apparatus 1300 may communicate wirelessly with a base station for a wireless communication system or with the router/modem 1326. In the alternative, the apparatus 1300 may communicate with a video streaming system 1200 via a local area network, virtual private network, or other network. In another alternative, the apparatus 1300 may be incorporated as a module or component of the system 1200 and communicate with other components via the bus 1314 or by some other modality.

The apparatus 1300 may be connected (e.g., via the bus 1314 and graphics processing unit 1320) to a display unit 1328. A display 1328 may include any suitable configuration for displaying information to an operator of the apparatus 1300. For example, a display 1328 may include or utilize a liquid crystal display (LCD), touchscreen LCD (e.g., capacitive display), light emitting diode (LED) display, projector, or other display device to present information to a user of the apparatus 1300 in a visual display.

One or more input devices 1330 (e.g., an alphanumeric keyboard, microphone, keypad, remote controller, game controller, camera, or camera array) may be connected to the bus 1314 via a user input port 1322 to communicate information and commands to the apparatus 1300. In selected embodiments, an input device 1330 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1328, for example using a touch sensitive screen. A cursor control device may communicate direction information and command selections to the processor 1302 and control cursor movement on the display 1328. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    receiving, by a computing device, a manifest presentation description for a media presentation, the manifest presentation description including an opportunity that requires resolution to determine supplemental content for the opportunity;
    sending, by the computing device, a request to resolve the opportunity, wherein information for the supplemental content that is received from the request is inserted in a first instance of the manifest presentation description;
    storing, by the computing device, the information for the supplemental content in association with an identifier for the opportunity;
    receiving, by the computing device, an update to the manifest presentation description, wherein the update to the manifest presentation description includes the opportunity that requires resolution to determine supplemental content for the opportunity;
    storing, by the computing device, a second instance of the manifest presentation description based on the update to the manifest presentation description, wherein the second instance of the manifest presentation description does not include the information for the supplemental content; and
    retrieving, by the computing device, the information for the supplemental content that was stored in association with the identifier for the opportunity without sending a request for resolution of the opportunity and inserting the information for the supplemental content into the second instance of the manifest presentation description.

2. The method of claim 1, further comprising:
    storing the first instance of the manifest presentation description; and inserting the information for the supplemental content in the opportunity in the first instance of the manifest presentation description.

3. The method of claim 1, further comprising:
using the information for the supplemental content to request the supplemental content during playback of the media presentation.

4. The method of claim 1, wherein receiving the manifest presentation description comprises:
determining that the opportunity should be resolved upon receiving the manifest presentation description; and
sending a request to resolve the opportunity upon receiving the manifest presentation description.

5. The method of claim 1, wherein sending the request to resolve the opportunity comprises:
determining that the opportunity should be resolved at a later time after receiving the manifest presentation description; and
upon a condition being met after receiving the manifest presentation description, sending a request to resolve the opportunity.

6. The method of claim 5, wherein the condition is met after a portion of the media presentation is played upon receiving the manifest presentation description.

7. The method of claim 1, wherein the information for the supplemental content and the identifier are stored in a data structure that persists after receiving the update to the manifest presentation description.

8. The method of claim 1, further comprising:
inserting the information for the supplemental content in the second instance of the manifest presentation description without sending the request for resolution of the opportunity.

9. The method of claim 1, wherein the request to resolve the opportunity is sent to a remote device.

10. The method of claim 1, wherein the update to the manifest presentation description does not include the information for the supplemental content that is received from sending the request.

11. The method of claim 1, further comprising:
reviewing the update to the manifest presentation description to determine the identifier is associated with the opportunity; and
determining that the opportunity has been resolved previously based on the identifier being stored in a data structure.

12. The method of claim 1, further comprising:
sending a new request to resolve a new opportunity, wherein information for new supplemental content is received from the new request and is inserted in the second instance of the manifest presentation description.

13. The method of claim 1, wherein the second instance of the manifest presentation description replaces the first instance of the manifest presentation description.

14. The method of claim 1, further comprising:
storing the first instance of the manifest presentation description in memory;
inserting the information for the supplemental content in the first instance of the manifest presentation description;
storing the second instance of the manifest presentation description in the memory to replace the first instance of the manifest presentation description; and
inserting the stored information for the supplemental content in the second instance of the manifest presentation description.

15. The method of claim 1, further comprising:
storing a first instance of the manifest presentation description, wherein the first instance of the manifest presentation description includes the information for the supplemental content.

16. A non-transitory computer-readable storage medium having stored thereon computer executable instructions, which when executed by a computing device, cause the computing device to be operable for:
receiving a manifest presentation description for a media presentation, the manifest presentation description including an opportunity that requires resolution to determine supplemental content for the opportunity;
sending a request to resolve the opportunity, wherein information for the supplemental content that is received from the request is inserted in a first instance of the manifest presentation description;
storing the information for the supplemental content in association with an identifier for the opportunity;
receiving an update to the manifest presentation description, wherein the update to the manifest presentation description includes the opportunity that requires resolution to determine supplemental content for the opportunity;
storing a second instance of the manifest presentation description based on the update to the manifest presentation description, wherein the second instance of the manifest presentation description does not include the information for the supplemental content; and
retrieving the information for the supplemental content that was stored in association with the identifier for the opportunity without sending a request for resolution of the opportunity and inserting the information for the supplemental content into the second instance of the manifest presentation description.

17. The non-transitory computer-readable storage medium of claim 16, further operable for:
storing the first instance of the manifest presentation description; and
inserting the information for the supplemental content in the opportunity in the first instance of the manifest presentation description.

18. The non-transitory computer-readable storage medium of claim 16, wherein the information for the supplemental content and the identifier are stored in a data structure that persists after receiving the update to the manifest presentation description.

19. The non-transitory computer-readable storage medium of claim 16, further operable for:
inserting the information for the supplemental content in the second instance of the manifest presentation description without sending the request for resolution of the opportunity.

20. The non-transitory computer-readable storage medium of claim 16, further operable for:
storing the first instance of the manifest presentation description in memory;
inserting the information for the supplemental content in the first instance of the manifest presentation description;
storing the second instance of the manifest presentation description in the memory to replace the first instance of the manifest presentation description; and
inserting the stored information for the supplemental content in the second instance of the manifest presentation description.

21. An apparatus comprising:
   one or more computer processors; and
   a computer-readable storage medium comprising instructions for controlling the one or more computer processors to be operable for:
   receiving a manifest presentation description for a media presentation, the manifest presentation description including an opportunity that requires resolution to determine supplemental content for the opportunity;
   sending a request to resolve the opportunity, wherein information for the supplemental content that is received from the request is inserted in a first instance of the manifest presentation description;
   storing the information for the supplemental content in association with an identifier for the opportunity;
   receiving an update to the manifest presentation description, wherein the update to the manifest presentation description includes the opportunity that requires resolution to determine supplemental content for the opportunity;
   storing a second instance of the manifest presentation description based on the update to the manifest presentation description, wherein the second instance of the manifest presentation description does not include the information for the supplemental content; and
   retrieving the information for the supplemental content that was stored in association with the identifier for the opportunity without sending a request for resolution of the opportunity and inserting the information for the supplemental content into the second instance of the manifest presentation description.

* * * * *